W. E. SPARKS.
LOCK.
APPLICATION FILED MAR. 12, 1913.
1,100,266.
Patented June 16, 1914.
4 SHEETS—SHEET 1.
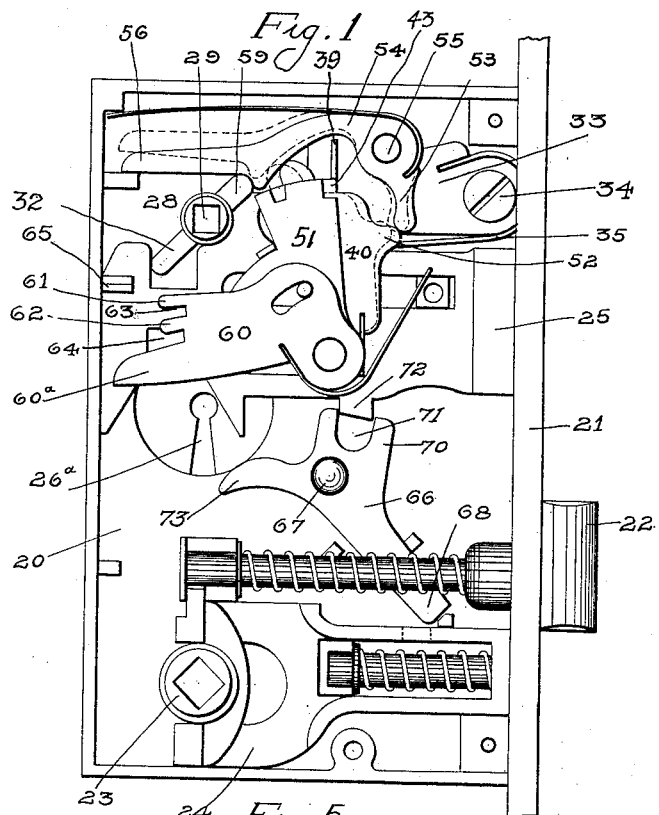
Fig. 1.
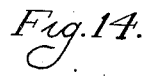
Fig. 14.
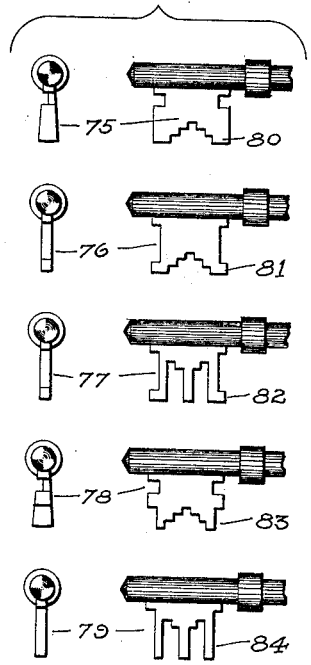
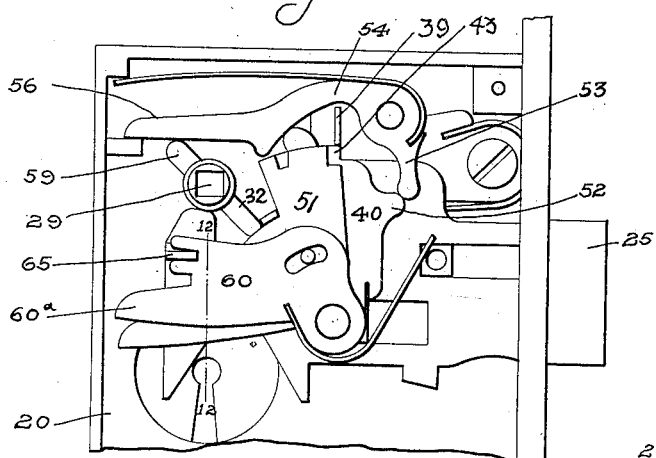
Fig. 5.
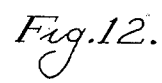
Fig. 12.
WITNESSES:
Fred A. Carlson
M. Olive Williams
INVENTOR:
William E. Sparks,
BY
Henry E. Rock
ATTORNEY.

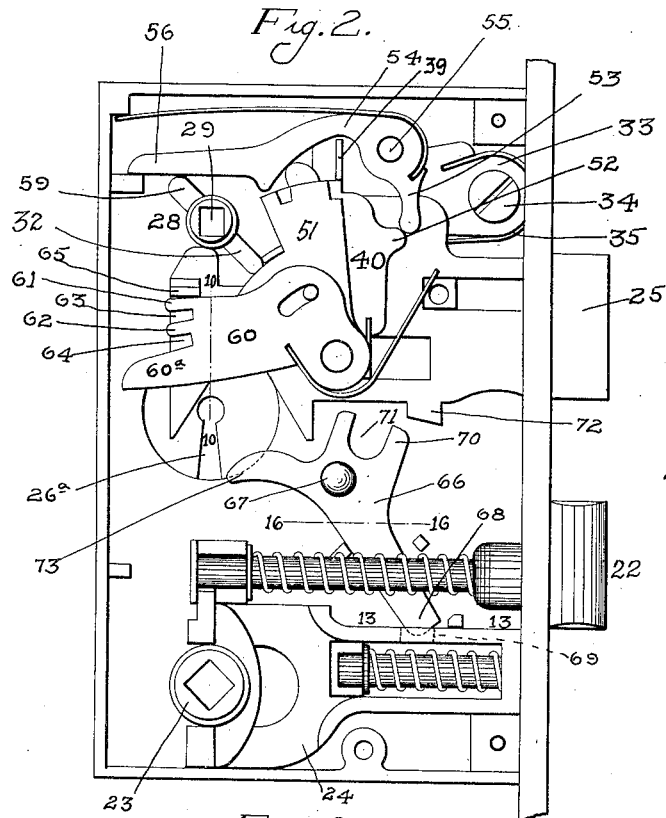
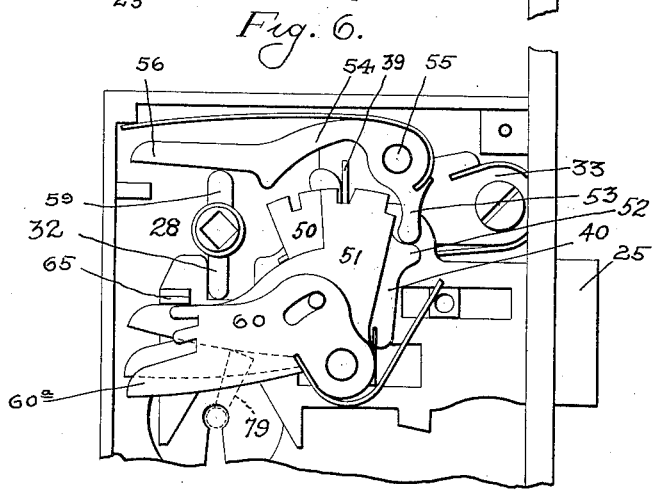
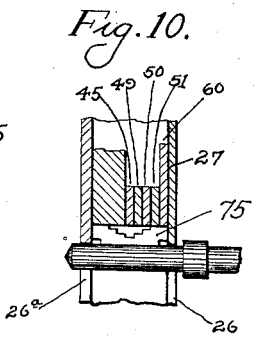
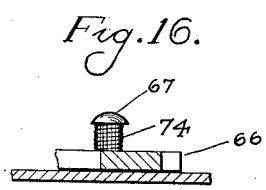
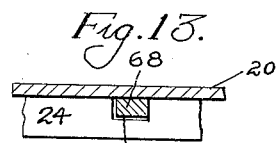
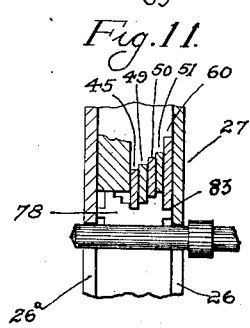

W. E. SPARKS.
LOCK.
APPLICATION FILED MAR. 12, 1913.
1,100,266.
Patented June 16, 1914.
4 SHEETS—SHEET 3.
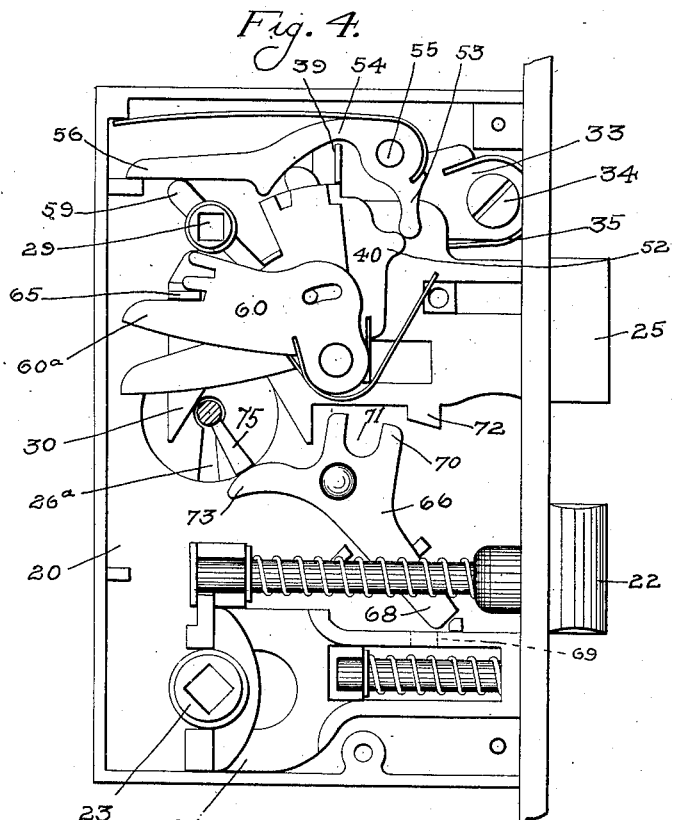
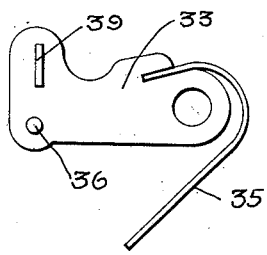
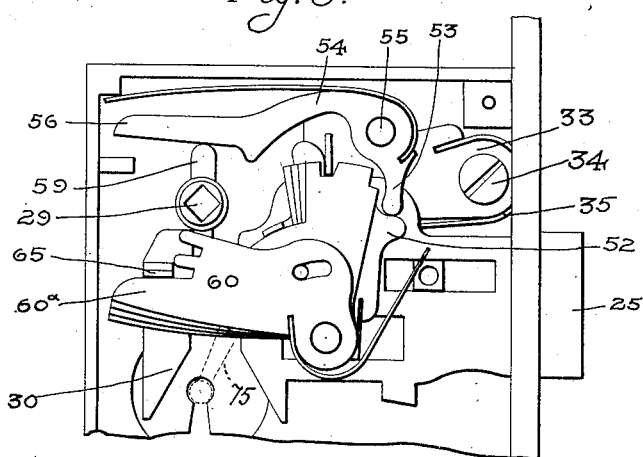
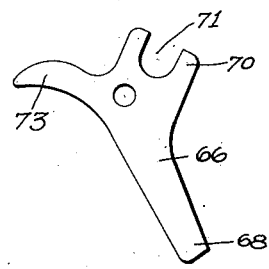
WITNESSES:
Fred A. Carlson
M. Olive Williams
INVENTOR:
William E. Sparks,
BY
Henry E. Hotchkiss
ATTORNEY.
COLUMBIA PLANOGRAPH CO., WASHINGTON, D. C.

W. E. SPARKS.
LOCK.
APPLICATION FILED MAR. 12, 1913.
1,100,266.
Patented June 16, 1914.
4 SHEETS—SHEET 4.
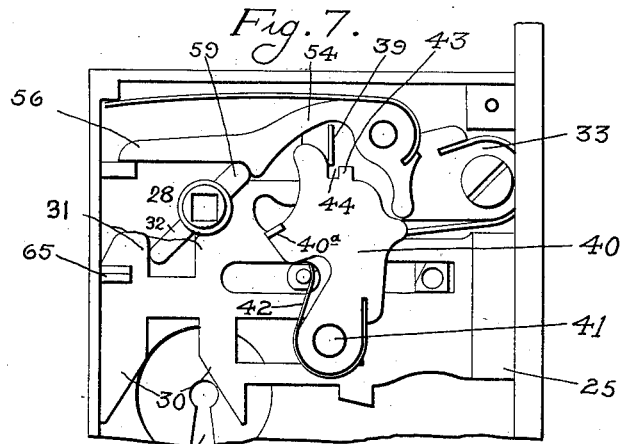
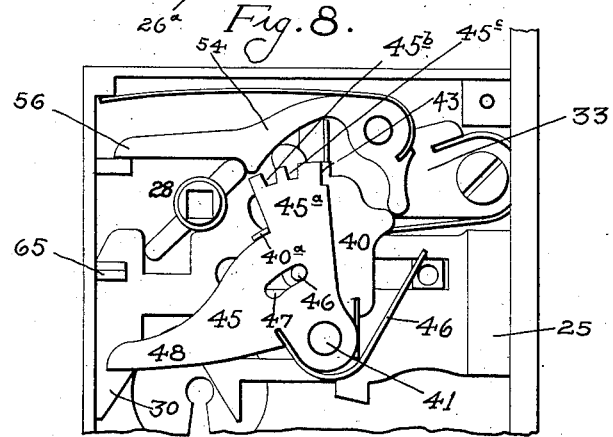
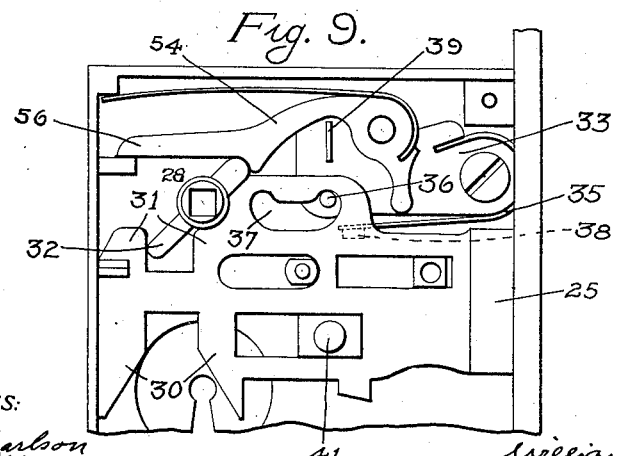

UNITED STATES PATENT OFFICE.

WILLIAM E. SPARKS, OF NEW HAVEN, CONNECTICUT, ASSIGNOR TO SARGENT & COMPANY, OF NEW HAVEN, CONNECTICUT, A CORPORATION OF CONNECTICUT.

LOCK.

1,100,266. Specification of Letters Patent. Patented June 16, 1914.

Application filed March 12, 1913. Serial No. 753,774.

*To all whom it may concern:*

Be it known that I, WILLIAM E. SPARKS, a citizen of the United States, residing in New Haven, county of New Haven, and State of Connecticut, have invented certain new and useful Improvements in Locks, of which the following is a full, clear, and exact description.

This invention relates to locks and more particularly to hotel locks having a single dead bolt protractable from the outside by a series of keys and protractable from the inside by a thumb-turn or a key.

The present improvements are especially applicable to a single bolt hotel lock of the above type which is operated by a series of the usual winged keys, but certain features of the invention may be used to advantage in other applications or connections.

One of the primary objects of the invention is to provide a lock of the single bolt type having improved means for throwing the bolt from the inside of the room by a thumb-turn or the like, and improved means for blocking the retraction of the bolt from the outside of the room by any but the emergency key when said bolt has been thrown from the inside.

My invention also contemplates the provision of a movable ward associated with the keyhole by way of which the bolt is operated from the outside of the door, which ward is automatically locked in a certain blocking position as the bolt is thrown by the inside protracting means, in which position the retraction of the bolt from the outside by any but the emergency key will be prevented. When the bolt is thrown from the outside by the emergency key, the ward will be locked in this same blocking position, so that access to the room will be confined to the proprietor. When the bolt is protracted from the outside by the guest or change key the ward will be held in an inoperative position and when said bolt is protracted from the outside by means of a display key the ward will be held in such a position that it will block every key of the series except the emergency key.

The present improvements also include the provision of a single dead bolt having tumbler mechanism by which it is protractable directly from either the outside of the door or the inside, the protraction from the outside being effected only by the joint action of a number of tumblers, whereas the bolt may be protracted from the inside by the individual actuation of a single tumbler of the series. More particularly, the bolt is thrown from the outside by the joint angular movement of a number of pivoted tumblers engaged by the key, whereas protraction of the bolt from the inside may be effected by means of a thumb-turn hub having means to release one tumbler and other means to engage suitable talons of the bolt.

Another feature of importance resides in the provision of improved means for dogging the usual latch bolt knob when the bolt is thrown from the inside without dogging such knob when the bolt is thrown from the outside so that the blocking of the knob will serve to indicate that the room is occupied. More specifically, it is intended to provide a dogging member for the latch bolt shoe or yoke which is moved into dogging position automatically as the bolt is thrown from either side of the door, but which is moved out of dogging position by the key employed in throwing the bolt from the outside, as said key completes the throwing of the bolt and before the key reaches a position in which it may be withdrawn from the keyhole.

To these and other ends, the invention consists in the novel features and combinations of parts to be hereinafter described and claimed.

In the accompanying drawings, Figure 1 is a side elevation of a lock embodying my invention with the cap plate removed, the dead bolt being retracted. Fig. 2 is a view similar to Fig. 1 showing the parts as they appear when the dead bolt has been thrown from the inside of the room, Fig. 3 shows the upper portion of the lock with the parts in the position which they assume when the dead bolt is partially thrown from the outside by the guest key, Fig. 4 is a view similar to Fig. 2 but showing the position of the parts when the bolt has been fully thrown by the guest key, Fig. 5 shows the tumbler mechanism in the position which it assumes when the bolt is thrown by the display key, Fig. 6 is a similar view showing the position of the tumblers as the bolt is partially thrown by the emergency key, Fig. 7 is a view of the upper part of the lock with all of the tumblers omitted except the stop tumbler, Fig. 8 is a similar view showing two of the tumblers in position, Fig. 9 is a similar view with all of the tumblers omitted, Fig. 10 is a section on line 10—10 of Fig. 2 showing how the guest key is blocked by the ward, Fig. 11 is a similar section showing how the display key is blocked by the ward, Fig. 12 is a section on line 12—12 of Fig. 5 showing how the guest key is blocked by the ward when the bolt has been thrown by the display key, Fig. 13 is a detail section on line 13—13 of Fig. 2, Fig. 14 shows the bits of the various keys of the series, Fig. 15 is a detail view of the pivoted bolt locking member or racking piece, Fig. 16 is a section on line 16—16 of Fig. 2, and Fig. 17 is a detail of the dogging lever for the knob yoke.

Referring to the drawings, 20 indicates the lock case having a face plate 21, and 22 is the usual latch bolt retractable by means of a knob (not shown) connected in the customary manner with a hub 23 and the knob shoe or yoke 24. The dead bolt 25 is located above the latch bolt in the form illustrated, but this is not a material feature of the invention. The dead bolt 25 may be operated from the outside of the door by means of a key inserted in a keyhole 26 in the cap plate 27 (Fig. 10) or by a key inserted in a keyhole 26ᵃ at the back or bottom of the case in line with the keyhole 26. The bolt 25 may also be operated by a thumb-turn member 28 comprising a hub mounted to turn in the cap plate and back of the case in the usual manner and having a square hole 29 for engagement with the thumb-turn spindle. By providing keyholes 26 and 26ᵃ at opposite sides of the case, and having the hub 28 accessible at opposite sides of the case, the lock is made reversible, the latch bolt 22 being reversible in the usual manner. When the lock is mortised in the door one of the keyholes 26 and 26ᵃ will be covered by the wood of the door or by the escutcheon and that end of the hub 28 which is at the opposite side of the door will be similarly covered, as will be understood by those versed in the art.

The bolt 25 is provided adjacent the keyholes 26, 26ᵃ with the usual talons 30, and at the opposite edges of the bolt the same is provided with another pair of talons 31 to coöperate with a wing or bit 32 of the thumb-turn hub 28. It will therefore be understood that in the embodiment shown the bolt will be protractable from one side of the door (the outside) by a key engaging the talons 30, whereas the protraction of the bolt from the opposite side of the door (the inside) may be effected by means of the thumb-turn member 28 or its equivalent coöperating with the second pair of talons 31.

Before describing the tumbler mechanism in detail, it may be well to state that said mechanism embodies certain features shown in Patent No. 1,040,245 issued to myself and Oliver F. Sparks on October 1st, 1912, together with other features set forth in my applications Serial Nos. 639,961 and 639,962, filed July 22, 1911.

In the present instance the bolt 25 is locked or held in protracted or retracted position by means of a pivoted locking member or racking piece 33 pivoted in the case at 34 and acted on by a spring 35. This racking piece 33 carries a pin 36 (Figs. 9 and 15) operating in a slot 37 of the bolt having notched ends and an intermediate cam portion, substantially as shown in the above mentioned patent. The spring 35 of the racking piece 33 reacts at one end against a lug 38 on the case and urges the racking piece upward so as to hold the pin 36 in firm engagement with one of the end seats or notches of the slot 37, whereby the bolt will be firmly held against movement. The racking piece 33 carries a lug or feather 39 adapted to coöperate with a stop tumbler 40 mounted on a post 41 and acted on by a spring 42. At its free end the stop tumbler 40 is provided with a tooth 43 adapted to move into and out of alinement with the lug or feather 39 as said tumbler is rocked on its pivot. The spring 42 normally holds the tumbler 40 in the position shown in Fig. 7 wherein the lug or feather 39 is in alinement with and adapted to enter a notch 44 at one side of the tooth 43. However, when the next tumbler 45 is placed over the tumbler 40 and pivotally mounted on the post 41, the spring 46 of the tumbler 45 will hold the tumbler 40 in such a position that the tooth 43 is in line with the feather 39 and blocks the downward movement of the racking piece 33. This result is due to the fact that the spring 46, which urges the tumbler 45 in a direction opposite to that in which the tumbler 40 is urged by the spring 42, is considerably stronger than said spring 42, so as to overcome the action of the latter and press the tumbler 40 to the left with reference to Fig. 7, by engagement of an upwardly extending arm 45ᵃ on the tumbler 45 with an upstanding lug 40ᵃ on the tumbler 40. The tooth 43 of the tumbler 40 is prevented from passing beyond the line of the lug or feather 39 by means of a stop pin 46 passing through a slot 47 in the tumbler 45.

The tumbler 45 is provided at its upper edge with notches 45ᵇ, 45ᶜ which coöperate with the lug of the racking piece in the manner to be presently described. This tumbler is also provided with a sweep or extension 48 overlying the talons of the bolt and adapted to be engaged by the bit of the key. Superposed on the tumbler 45 and mounted on the same post 41 are a number of other tumblers of the same general character as the tumbler 45, each of these tumblers being provided with a notched edge to coöperate with the lug of the racking piece and with the sweep or extension to be engaged by the bit of the key. Referring particularly to Fig. 10, it will be noted that in the embodiment shown three tumblers 49, 50 and 51 similar to the tumbler 45, are placed on top of said tumbler 45 although it will be understood that the number of these tumblers is not an essential feature.

At one side of the stop tumbler 40 the same is provided with a laterally extending nose or projection 52 adapted to be engaged by the depending nose 53 of a lever 54, in the nature of a tumbler, actuated by the thumb-turn hub 28. The lever 54 is pivoted intermediate of its ends on a pin 55 and it is provided with a sweep 56 adapted to be engaged by a wing or bit 59 on the hub 28 located diametrically opposite the wing or bit 32. By this construction the hub 28 in being rotated in an anticlockwise direction with respect to Fig. 1 lifts the sweep 56 of the lever 54 and thereby shifts the stop tumbler 40 to the left before the wing 32 of the hub begins to protract the bolt. The latter is released as soon as the tooth 43 is moved out of alinement with the lug or feather 39, substantially as described in my application Serial No. 639,962 mentioned above, the stop tumbler 40 being the only member normally preventing the release of the bolt with the tumblers 45, 49, 50 and 51 in their normal stationary position.

In order to block the operation of certain keys in the outside keyhole under the circumstances hereinafter named, I provide a movable ward 60 in association with the keyholes 26, 26ª. This ward 60 is in the form of a lever and may be mounted on the tumbler post 41 on top of the tumblers 45, 49, 50 and 51. This movable ward is provided with an arm or sweep 60ª adapted to be engaged by certain keys, as hereinafter explained, and at its free end it is provided with lugs 61 and 62 creating stop notches 63 and 64 respectively, adapted to coöperate with a lug 65 fixed on the tail of the bolt.

In order to block the outside knob when the bolt 25 is thrown from the inside of the room, I provide a dogging lever 66 pivoted in the case on a pin or post 67. This lever 66 is provided with a depending arm 68 adapted to enter a notch or opening 69 in the knob shoe 24. The lever is furthermore provided with a bifurcated arm 70 presenting a notch 71 adapted to receive a beveled lug 72 projecting downward from the bolt. A third arm 73 of the lever 66 is adapted to project into the path of a key rotated in either of the keyholes 26 or 26ª as hereinafter described. A spring 74 interposed between the face of the lever 66 and the head of the pivot or post 67 prevents accidental dislocation of the dogging lever when it has been moved to the dogging position shown in Fig. 2 or the released position shown in Fig. 1.

Fig. 14 shows the bits of the keys used in connection with this lock. 75 is the guest key bit, 76 the master key bit, 77 the grandmaster key bit, 78 the bit of the display key and 79 the bit of the emergency key. The bits 75, 76 and 77 are provided with full ends or corners 80, 81 and 82 respectively, to engage and raise the movable ward 60 at the same time that the regular tumblers of the bolt are actuated in the usual manner. The display key bit 78, on the other hand, is slightly cut away at the corners, as shown at 83, in order to raise the movable ward 60 to a less extent; and the bit 79 of the emergency key is completely cut away at the ends, as shown at 84, in order to clear the ward entirely. The other distinctions between the various keys will be apparent to those skilled in the art and they need not be mentioned in further detail.

The operation of the improved lock is substantially as follows: Supposing that the guest wishes to lock his room against intrusion, he manipulates the thumb-turn in such a manner as to rotate the hub 28 in an anticlockwise direction with respect to Fig. 1. The wing or bit 59 of the hub 28 acts on the lever 54 in the manner previously described and shifts the stop tumbler 40 toward the left into an inoperative position. As there is then nothing to prevent the downward movement of the feather or lug 39 of the racking piece, the continued rotation of the hub 28 will protract the bolt. Hence it will be understood that the bolt is protracted from the inside by the individual actuation of the stop tumbler 40 without actuating the other tumblers 45, 49, 50 and 51 and without actuating the ward 60. As the bolt 25 moves to its fully protracted position the lug 65 on the tail thereof will ride over the top edge of the lug 61 of the movable ward so that said ward will be blocked against upward movement away from the keyhole. Hence the door cannot be opened except by a key which will pass the ward 60, and as the emergency key having the bit 79, is the only key which will do this, access to the room will be confined to the proprietor of the hotel and it will be impossible for the possessor of a master key, grandmaster key or a display key to enter the room. If a chambermaid takes hold of the outside knob she will find it blocked against rotation, for the outward movement of the bolt causes the lug 72 coöperating with the notch 71 of the dogging lever 66, to oscillate the lever 66 into that position wherein its lower end engages the notch 69 of the knob shoe. In this position of the parts, which is shown in Fig. 2, the lever 66 will block a retracting movement of the knob shoe or yoke 24, and hence it will be impossible for the chambermaid to rotate the knob. As the knob is not blocked when the bolt is thrown from the outside (as hereinafter described) it is only necessary to grasp the knob in order to ascertain whether or not the room is occupied.

If the proprietor desires to open the door after it has been locked from the inside, he may do so by inserting the emergency key in the outside keyhole. This key will clear the ward 60, as previously stated, and it will move the several tumblers 40, 45, 49, 50 and 51 in a clockwise direction with reference to Fig. 2 until the notch 44 on the stop tumbler 40 is in line with a number of other notches of the tumblers 45, 49, 50 and 51 and with the feather or lug 39 of the racking piece, whereupon the bolt can be retracted in an obvious manner.

It will be noted from Fig. 2 that when the bolt has been thrown from the inside, the arm 73 of the dogging lever will project slightly into the path of rotation of a key inserted in either keyhole, and hence before the emergency key will coöperate with the bolt talons 30, its wing or bit will have to engage the arm 73 and move it out of the path of the key. In this manner the knob shoe and the knob will be released by the emergency key before the latter retracts the bolt.

When the door is to be locked from the outside by the guest key, the rotation of said key in the outside keyhole will cause the key bit 75 to engage and raise the notched tumblers 45, 49, 50 and 51. These tumblers will release the stop tumbler 40 and allow it to shift to the right so that when the key reaches a certain position, as shown in Fig. 3, the lug or feather 39 of the pivoted racking piece 33 may move downward into the notch or recess 44 of the stop tumbler and into certain notches of the tumblers 45, 49, 50 and 51, which are also in alinement with said lug or feather 39. Hence the bolt is released by the angular movement of the tumblers to a definite releasing position under the impulse of the key and the engagement of the key with the talons 30 will then be effective to protract the bolt. The guest key not only raises the tumblers 45, 49, 50 and 51 but it also engages and raises the pivoted ward 60, inasmuch as one of the full corners 80 of the bit 75 will contact with the lower edge of the ward as the key is rotated. The key raises the ward 60 to the extent shown in Fig. 3, and as the bolt moves to its fully protracted position, the lug 65 on the tail thereof will engage in the notch 64 at the free end of the ward and thereby lock the ward in the position shown in Fig. 4. This position of the ward is an inoperative one in which it is held out of the path of all of the key bits and accordingly, after the bolt has been thrown by the guest key it may be retracted by any key of the series. As the bolt moves home the lug 72 thereof engages the dogging lever 66 and blocks the knob shoe 24, but the impetus of the key is ordinarily such as to cause it to engage the arm 73 of the dogging lever with some force so as to move said lever out of engagement with the notch 69 of the knob shoe, and in any event, the key bit must engage the arm 73 and release the dogging member 66 before the key reaches the position in which it may be withdrawn from the keyhole. The action of all the various keys in relation to the dogging member 66 is the same as that of the guest key, and hence it will be understood that when the bolt is thrown by any one of the keys from the outside of the door, the knob shoe will be left free so that the knob can be rotated. Hence when a chambermaid or other person finds the knob fixed in position, the inference is that the door has been locked from the inside. This general result has been obtained heretofore, but I know of no case where the blocking member for the knob is operable by direct engagement with a key in the manner described.

When the door is locked from the outside by means of the display key, having the bit 78, the ward 60 will be raised to a less extent than in the case of the guest key owing to the fact that the corners of the display key bit are cut away to a certain extent, as shown at 83. The arrangement is such that as the bolt moves home the lug 65 on the tail thereof will engage the notch 63 of the ward, as shown in Fig. 5, and thereby lock the ward in a partially raised position. In this position the ward will block the guest key bit 75, the master key bit 76 and the grand-master key bit 77 owing to the fact that the full corners 80, 81 and 82 of said bits will not clear the ward, but of course the bolt can be retracted by the display key, and obviously it may be retracted by the emergency key bit 79 owing to the fact that said bit 79 is completely cut away at the ends to clear the ward entirely. Hence the display key locks the door against the keys of lower order, but it does not lock it against itself or against the emergency key.

As the emergency key clears the ward entirely, said ward will not be raised at all when the bolt is thrown from the outside by the emergency key, and as a result, the lug 65 on the tail of the bolt will take a position over the upper lug 61 of the ward, whereby the ward will be locked in its normal or lowermost position, which is the same position in which it is locked by the throwing of the bolt from the inside. Fig. 6 shows the bolt partially thrown by the emergency key. The locking of the ward in the lowermost position by the emergency key will prevent the lock from being operated by any of the other keys inasmuch as said keys are not bitted to clear the ward. The pivoted notched tumblers 45, 49, 50 and 51 may be moved to different releasing positions by different keys, as described in Patent No. 1,040,245 above mentioned. In the case illustrated, it will be noted that the releasing position for the guest key shown in Fig. 3, is different from the releasing position for the emergency key, shown in Fig. 6. By comparing the key bits shown in Fig. 14, it will be noted that in the present embodiment, the guest key, the master key and the display key will move the tumblers angularly to the same releasing position, while the grandmaster key and the emergency key will move the tumblers to the same position but one differing from the first named position.

While the foregoing description is necessarily a detailed one in so far as it concerns the particular lock selected for illustration and description, it will be apparent that the invention is susceptible of numerous modifications within the scope of the appended claims.

I do not claim herein the broad combination in a lock, of a case, a bolt in said case, a keyhole at one side of the door, a plurality of tumblers for said bolt, a key insertible in said keyhole to actuate said bolt, and adapted to move a number of said tumblers into a predetermined releasing position, and means operable from the opposite side of the door to release and operate said bolt by the actuation of a less number of tumblers; nor do I claim other features broadly claimed in my application Serial No. 639,961, above identified. Moreover, I do not claim broadly herein the combination in a lock, of a case having a keyhole at one side, a deadbolt in said case, a plurality of tumblers for said deadbolt jointly operable by a key inserted in said keyhole, and means including a member pivoted in the case to retract said bolt by the individual operation of one of said tumblers; nor do I claim other features broadly claimed in my application Serial No. 639,962 previously mentioned.

What I claim is:

1. In a lock, a deadbolt having a single shank, talons on opposite sides of said shank, a plurality of locking tumblers for said bolt, a case for said bolt having a keyhole at one side, a key insertible into said keyhole and coöperating with the talons at one side of the bolt, and adapted to engage said tumblers directly to protract the bolt, means operative from the side of the case opposite said keyhole, and coöperating with the pair of talons at the other side of the bolt shank, and a member operated by said last named means to actuate the tumbler mechanism and to protract the bolt; substantially as described.

2. In a lock, the combination of a case having a keyhole at one side, a deadbolt in said case having a single shank, talons on opposite sides of said shank, tumbler mechanism for said bolt, including a plurality of locking tumblers, a plurality of keys, including an emergency key, insertible into said keyhole to engage said tumblers directly and protract the bolt, protracting means coöperating with the other pair of talons at the opposite side of the bolt, means at the last named side of the bolt actuated by said protracting means to release the tumbler mechanism, and means including a movable key blocking member associated with said keyhole to prevent the retraction of said bolt by all of said keys except the emergency key when said bolt has been protracted by said second protracting means; substantially as described.

3. In a lock, the combination of a case having a keyhole at the outside of the door, a bolt in said case having a single shank, pairs of talons on opposite sides of said shank, tumbler mechanism for said bolt, including a plurality of pivoted locking tumblers, a key insertible into said keyhole to engage said tumblers directly and protract the bolt by coöperating with one pair of talons, a thumb-turn member, adapted for operation from the inside of the door, coöperating with the other pair of talons at the opposite side of the bolt, and means in the case actuated by said thumb-turn member, and located at the same side of the bolt, for actuating said tumbler mechanism to release the bolt; substantially as described.

4. In a lock, a dead bolt, a plurality of tumblers therefor, thumb-turn means to protract said bolt by the individual actuation of one of said tumblers, and a key to protract said bolt by the joint actuation of all of said tumblers; substantially as described.

5. In a lock, a dead bolt, a plurality of tumblers therefor, a thumb-turn hub operable from the inside of the door to protract said bolt by the individual actuation of one of said tumblers, and a key operable from the outside of the door to protract said bolt by the joint actuation of said tumblers; substantially as described.

6. In a lock, a dead bolt, a plurality of pivoted tumblers therefor, means at the inside of the door to protract said bolt by the individual actuation of one of said tumblers, and a plurality of winged keys to protract said bolt from the outside of the door by the joint actuation of said tumblers; substantially as described.

7. In a lock, a dead bolt, a single group of pivoted tumblers therefor, means at one side of the door to protract said bolt by the individual actuation of one of said tumblers, means operable from the opposite side of the door to protract said bolt by the joint actuation of said tumblers, and means to block the retraction of said bolt from one side of the door when protracted from the other side; substantially as described.

8. In a lock, the combination of a dead bolt, a plurality of tumblers therefor, means at the inside of the door to throw said bolt by the individual actuation of one of said tumblers, a plurality of keys operable from the outside of the door to protract said bolt by the joint actuation of said tumblers, and means, including a movable ward, to block the retraction of said bolt by at least one of said keys when said bolt has been thrown from the inside; substantially as descsribed.

9. In a lock, a case having a keyhole, a dead bolt in said case, a plurality of tumblers for said bolt jointly releasable by a key inserted in said keyhole, and means for protracting said bolt from the side of the case opposite said keyhole, including a member in the case to release the bolt by shifting only one of said tumblers; substantially as described.

10. In a lock, a case having a keyhole, a dead bolt in said case, a plurality of tumblers for said bolt jointly releasable by a key inserted in said keyhole and engaging said tumblers, and thumb-turn means for protracting said bolt from the side of the case opposite said keyhole, including a member in the case to release the bolt by shifting only one of said tumblers; substantially as described.

11. In a lock, a case having a keyhole at one side, a dead bolt in said case, a plurality of pivoted tumblers for said dead bolt movable to a predetermined releasing position by a key inserted in said keyhole, said tumblers normally lying in another releasing position, a stop tumbler in the case to prevent normally the release of the bolt with said tumblers in said second releasing position, and thumb-turn means to protract said dead bolt from the side of the case opposite said keyhole, including a member to engage said stop tumbler and shift it into an inoperative position; substantially as described.

12. In a lock, the combination of a dead bolt, a plurality of tumblers for said dead bolt movable in the same direction to release said dead bolt and permit the protraction thereof from one side of the door, and thumb-turn means to protract said bolt from the opposite side of the door, including a member in the case to engage one of said tumblers and shift it individually; substantially as described.

13. In a lock, a case having a keyhole at one side of the door, a dead bolt in said case, and a single group of tumblers for said dead bolt, a plurality of keys insertible in said keyhole to operate said bolt, including a display key and an emergency key, thumb-turn means to protract said bolt from the opposite side of the door, and a movable ward associated with said keyhole and locked in one blocking position by the protraction of said bolt by the emergency key or by said thumb-turn means, and in another blocking position by the protraction of said bolt by the display key; substantially as described.

14. In a lock, a dead bolt having a pair of talons, a tumbler lever for said dead bolt, and a hub having a wing to engage said talons and another wing to engage said tumbler lever; substantially as described.

15. In a lock, a dead bolt having a pair of talons, a pivoted tumbler for said bolt, a lever to engage and shift said tumbler and thereby release the bolt, and a hub having one wing to engage said talons and another wing to engage said lever; substantially as described.

16. In a lock, the combination of a case having a keyhole, a latch bolt in said case, a key insertible in said keyhole, and a dogging member for said latch bolt projecting into the path of rotation of said key; substantially as described.

17. In a lock, a case having a keyhole, a key insertible into said keyhole and rotatable therein, a latch bolt in said case, a knob shoe for retracting said latch bolt, and a dogging device for said knob shoe having a part projecting into the path of rotation of said key; substantially as described.

18. In a lock, a dead bolt, a key for operating the same, a latch bolt, a knob, a knob shoe, and a dogging device for the knob shoe actuated by direct engagement with the key; substantially as described.

19. In a lock, a dead bolt, a key to protract the same, a latch bolt, and a dogging device for the latch bolt thrown into operative position by the protraction of said dead bolt and thrown out of operative position by the key; substantially as described.

21. In a lock, a case having a keyhole, a dead bolt in said case, a key insertible in said keyhole to protract said dead bolt, a latch bolt in said case, and a dogging device for said latch bolt thrown into operative position by the protraction of said dead bolt and movable out of dogging position by the key before the latter completes a full rotation in the keyhole; substantially as described.

21. In a lock, a case having a keyhole, a dead bolt in said case, a key insertible in said keyhole to protract said dead bolt, a latch bolt in said case, a knob shoe for retracting said latch bolt, and a pivoted dogging member for said shoe thrown into operative position by direct engagement with the dead bolt and thrown into inoperative position by engagement with the key before the latter completes a full rotation in the keyhole; substantially as described.

22. In a lock, a dead bolt, a key to protract said dead bolt from one side of the door, means to protract said dead bolt from the opposite side of the door, a latch bolt, a latch bolt manipulating device, and a dogging member for said manipulating device moved into dogging position by the bolt as the latter is protracted from either side of the door but moved out of dogging position by engagement with the key; substantially as described.

23. In a lock, a dead bolt, a key to protract the same from one side of the door, means to protract said bolt from the opposite side of the door, a latch bolt, a manipulating device for said latch bolt, and a blocking member for said manipulating device movable into inoperative position by the key; substantially as described.

24. In a lock, a dead bolt having different pairs of talons, a single group of tumblers for said dead bolt, means coöperating with one pair of talons to throw the bolt by the actuation of a plurality of tumblers, and means coöperating with the other pair of talons to throw the bolt by the actuation of a less number of tumblers; substantially as described.

25. In a lock, a case, a dead bolt therein, a group of tumblers for said dead bolt fixed relatively to said case, means to throw said dead bolt from one side of the door by the actuation of a plurality of tumblers, and means to throw said bolt from the opposite side of the door by the actuation of a less number of tumblers; substantially as described.

26. In a lock, a case, a dead bolt therein, a plurality of tumblers for said dead bolt fixed relatively to said case, means to protract said bolt from one side of the door by the actuation of all of the tumblers, and means to protract said bolt from the opposite side of the door by the individual actuation of one tumbler; substantially as described.

27. In a lock, the combination of a case, a dead bolt therein, a group of pivoted tumblers for said dead bolt fixed relatively to the case, means to protract said bolt from the outside of the door by the actuation of a plurality of tumblers, and means to protract said bolt from the inside of the door by the actuation of a single tumbler; substantially as described.

28. In a lock, the combination of a case, a dead bolt therein having a pair of talons, a plurality of pivoted tumblers for said dead bolt fixed relatively to the case, a thumb-turn hub coöperating with said talons to protract said bolt, and a key coöperating with the bolt at another point to protract the same, the protraction of the bolt by the key being effected by the joint actuation of a plurality of tumblers, and the protraction of the bolt by the thumb-turn hub being effected by the actuation of a less number of tumblers; substantially as described.

29. In a lock, the combination of a bolt, a tumbler therefor, means to protract said bolt by shifting said tumbler in one direction, and other means to protract said bolt by shifting said tumbler in the opposite direction; substantially as described.

30. In a lock, the combination of a bolt, a tumbler therefor movable in either direction to release the bolt, means to protract the bolt from one side of the door by shifting said tumbler in one direction, and means to protract the bolt from the opposite side of the door by shifting said tumbler in the opposite direction; substantially as described.

31. In a lock, the combination of a bolt, tumbler mechanism therefor including a stop tumbler movable in either of two directions to release the bolt, means operable from one side of the door to protract the bolt by moving said stop tumbler with the other tumblers in one direction, and means operable from the opposite side of the door to protract said bolt by shifting the stop tumbler individually in the opposite direction; substantially as described.

In witness whereof, I have hereunto set my hand on the 10th day of March 1913.

WILLIAM E. SPARKS.

Witnesses:
 TERESA FITZSIMONS,
 ZIEGLER SARGENT.